(12) United States Patent
Konik et al.

(10) Patent No.: US 11,487,760 B2
(45) Date of Patent: *Nov. 1, 2022

(54) QUERY PLAN MANAGEMENT ASSOCIATED WITH A SHARED POOL OF CONFIGURABLE COMPUTING RESOURCES

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/067,157

(22) Filed: Oct. 9, 2020

(65) Prior Publication Data

US 2021/0081420 A1 Mar. 18, 2021

Related U.S. Application Data

(63) Continuation of application No. 16/243,640, filed on Jan. 9, 2019, now Pat. No. 10,885,033, which is a continuation of application No. 14/994,125, filed on Jan. 12, 2016, now Pat. No. 10,242,054.

(51) Int. Cl.
*G06F 16/00* (2019.01)
*G06F 16/2453* (2019.01)
*G06F 16/188* (2019.01)
*G06F 9/455* (2018.01)

(52) U.S. Cl.
CPC ...... *G06F 16/24542* (2019.01); *G06F 16/196* (2019.01); *G06F 2009/4557* (2013.01); *G06F 2009/45575* (2013.01)

(58) Field of Classification Search
CPC ............ G06F 16/24542; G06F 16/196; G06F 9/45558; G06F 2009/45575
See application file for complete search history.

(56) References Cited

U.S. PATENT DOCUMENTS

| | | |
|---|---|---|
| 8,601,474 B2 | 12/2013 | Konik et al. |
| 9,641,406 B1 * | 5/2017 | Allen .................. G06F 8/65 |
| 10,242,054 B2 | 3/2019 | Konik et al. |

(Continued)

OTHER PUBLICATIONS

Anonymously; "A Method of Application Log Backup and Recovery when Using a Virtual Machine Snapshot" http://ip.com/IPCOM/000224388; Dec. 17, 2012.

(Continued)

*Primary Examiner* — Alexander Khong
(74) *Attorney, Agent, or Firm* — Robert J. Shatto

(57) ABSTRACT

Disclosed aspects relate to query plan management associated with a shared pool of configurable computing resources. A query, which relates to a set of data located on the shared pool of configurable computing resources, is detected. A virtual machine includes the set of data. With respect to the virtual machine, a set of burden values of performing a set of asset actions is determined. Based on the set of burden values, a query plan to access the set of data is established. Using at least one asset action of the set of asset actions, the query plan is processed.

20 Claims, 7 Drawing Sheets

(56) References Cited

U.S. PATENT DOCUMENTS

| | | | |
|---|---|---|---|
| 2008/0104608 A1* | 5/2008 | Hyser | G06F 9/5088 718/105 |
| 2013/0263117 A1* | 10/2013 | Konik | G06F 9/5077 718/1 |
| 2014/0317617 A1 | 10/2014 | O'Donnell et al. | |
| 2015/0112964 A1 | 4/2015 | Konik et al. | |
| 2015/0112968 A1 | 4/2015 | Konik et al. | |
| 2019/0146971 A1 | 5/2019 | Konik et al. | |

OTHER PUBLICATIONS

Anonymously; "Method and System for Effective Management of Virtual Machine Snapshot in a Virtual Datacenter"; http://ip.com/IPCOM/000210960; Sep. 19, 2011.

Anonymously; "Placement of Constrained Groups of Logical Application Components in a Cloud Computing Environment"; http://ip.com/IPCOM/000240632; Feb. 13, 2015.

Anonymously; "VM Migration based on multi criterion ranking of Hypervisors and Virtual Machines in Software Defined Data Center (SDDC) Environments"; http://ip.com/IPCOM/000240063; Dec. 29, 2014.

Anwar et al.,"Cost-Aware Cloud Metering with Scalable Service Management Infrastructure", IEEE, pp. 285-292, (Year: 2015).

Chang, R-I. et al.; ABSTRACT—"Particle Swarm Optimizer with Query-Based Learning for Virtual Machine Placement"; ICIC Express Letters, Part B : Applications, vol. 5, No. 1-2, pp. 545-551, Feb. 2014.

Mell, Peter, et al., The NIST Definition of Cloud Computing, National Institute of Standards and Technology, Oct. 7, 2009, Version 15, NIST, Gaithersburg, MD, US.

Rogers, Jennie, et al., "A Generic Auto-Provisioning Framework for Cloud Databases", <https://www.google.com/url?paf=&q=https://cs.brown.edu/people/jennie/research/provisioning.pdf&usg=AFQjCNE27kZDfEbWnUD4clHaL3zmrrO8Rw>.

Sao, Sham, "Airplanes and Events and Hotels Oh My: Harnessing the Power of XenDesktop's Offline Capabilities", <https://www.citrix.com/blogs/2013/03/26/airplanes-and-events-and-hotels-oh-my-harnessing-the-power-of-xendesktops-offline-capabilities/>, Mar. 26, 2013.

Strohmeyer, Kevin, "When to Use Offline VDI", <https://virtualizationreview.com/articles/2012/09/19/vendor-view-offline-vdi.aspx>, Sep. 19, 2012.

List of IBM Patents or Patent Applications Treated as Related, Oct. 9, 2020, 2 pgs.

* cited by examiner

QUERY PLAN MANAGEMENT ASSOCIATED WITH A SHARED POOL OF CONFIGURABLE COMPUTING RESOURCES

BACKGROUND

This disclosure relates generally to computer systems and, more particularly, relates to query plan management. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to query plan management associated with a shared pool of configurable computing resources. A query, which relates to a set of data located on the shared pool of configurable computing resources, is detected. A virtual machine includes the set of data. With respect to the virtual machine, a set of burden values of performing a set of asset actions is determined. Based on the set of burden values, a query plan to access the set of data is established. Using at least one asset action of the set of asset actions, the query plan is processed.

In embodiments, current and target states of the virtual machine may be identified. In various embodiments, the virtual machine indicates a hibernated, deactivated, or offline state, and the set of asset actions includes activation, deployment, or circumvention of the virtual machine. In embodiments, the virtual machine runs on a first physical compute node of the shared pool of configurable computing resources, and the set of asset actions includes migration of the virtual machine to a second physical compute node of the shared pool of configurable computing resources. In various embodiments, the set of asset actions includes activating the virtual machine in response to reducing a resource burden of a separate virtual machine.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
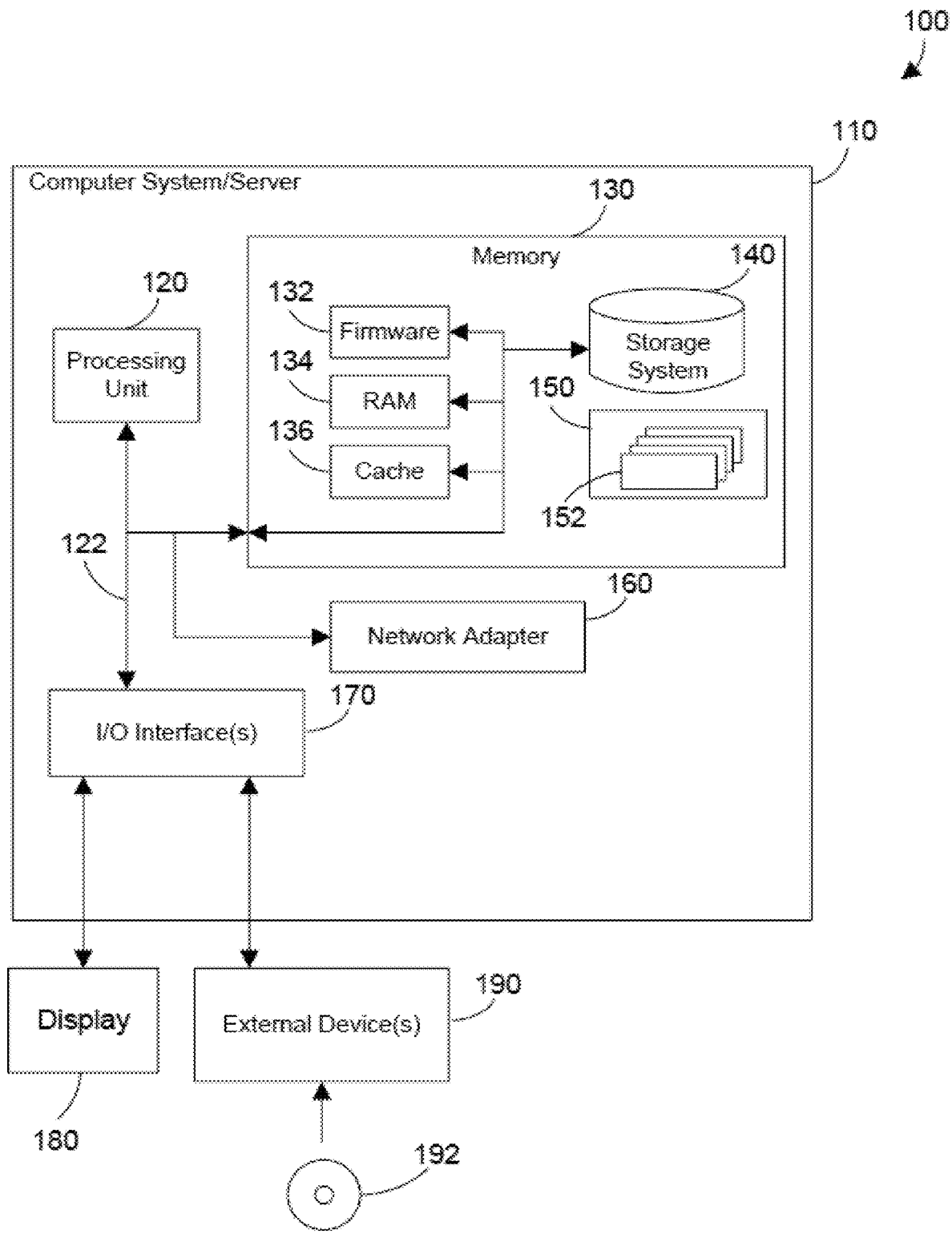
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to a query optimizer which is virtual machine aware and configured to initiate performance of virtual machine tasks as appropriate. For example, the query optimizer can include virtual machine burdens/costs such as deployment, activation, migration, or circumventing a virtual machine in burden/cost estimates of running a query (e.g., when developing a query plan). Features may relate to running queries with respect to database tables, indexes, or the like which are located on virtual machines that are not currently running. Such features may be applicable when a snapshot of the virtual machine is taken for historical reasons and saved (e.g., the query is to return historical information from the time that the virtual machine was saved) or when the virtual machine is offline (e.g., hibernated, shutdown) for a reason such as maintenance, functional challenges, or limited hardware availability. Aspects of the disclosure relate to the query optimizer proactively acting/responding when a virtual machine is not in a desired state to run a query effectively or efficiently.

Aspects of the disclosure include a computer-implemented method, system, and computer program product for query plan management associated with a shared pool of configurable computing resources. A query, which relates to a set of data located on the shared pool of configurable computing resources, is detected. A virtual machine (e.g., of the shared pool of configurable computing resources) includes the set of data. With respect to the virtual machine, a set of burden values of performing a set of asset actions is determined. Based on the set of burden values, a query plan to access the set of data is established. Using at least one asset action of the set of asset actions, the query plan is processed.

In embodiments, a current state of the virtual machine is identified (e.g., an error event is indicated for running the query). As such, a target state of the virtual machine may be identified (e.g., to run the query). In various embodiments, the virtual machine indicates a hibernated state, and the set of asset actions includes activation of the virtual machine. In various embodiments, the virtual machine indicates a deactivated state, and the set of asset actions includes deployment of the virtual machine. In certain embodiments, the virtual machine indicates an offline state, and the set of asset actions includes circumvention of the virtual machine using an associated physical disk to access the set of data. In certain embodiments, the virtual machine indicates an offline state, and the set of asset actions includes circumvention of the virtual machine by generating a light virtual machine to access the set of data.

In embodiments, the virtual machine runs on a first physical compute node of the shared pool of configurable computing resources, and the set of asset actions includes migration of the virtual machine to a second physical compute node of the shared pool of configurable computing resources. In various embodiments, the set of asset actions includes activating the virtual machine in response to reducing a resource burden of a separate virtual machine. Altogether, performance or efficiency benefits for query plan management associated with a shared pool of configurable computing resources may occur (e.g., speed, flexibility, load balancing, responsiveness, high availability, resource usage, productivity). Aspects may save computing resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
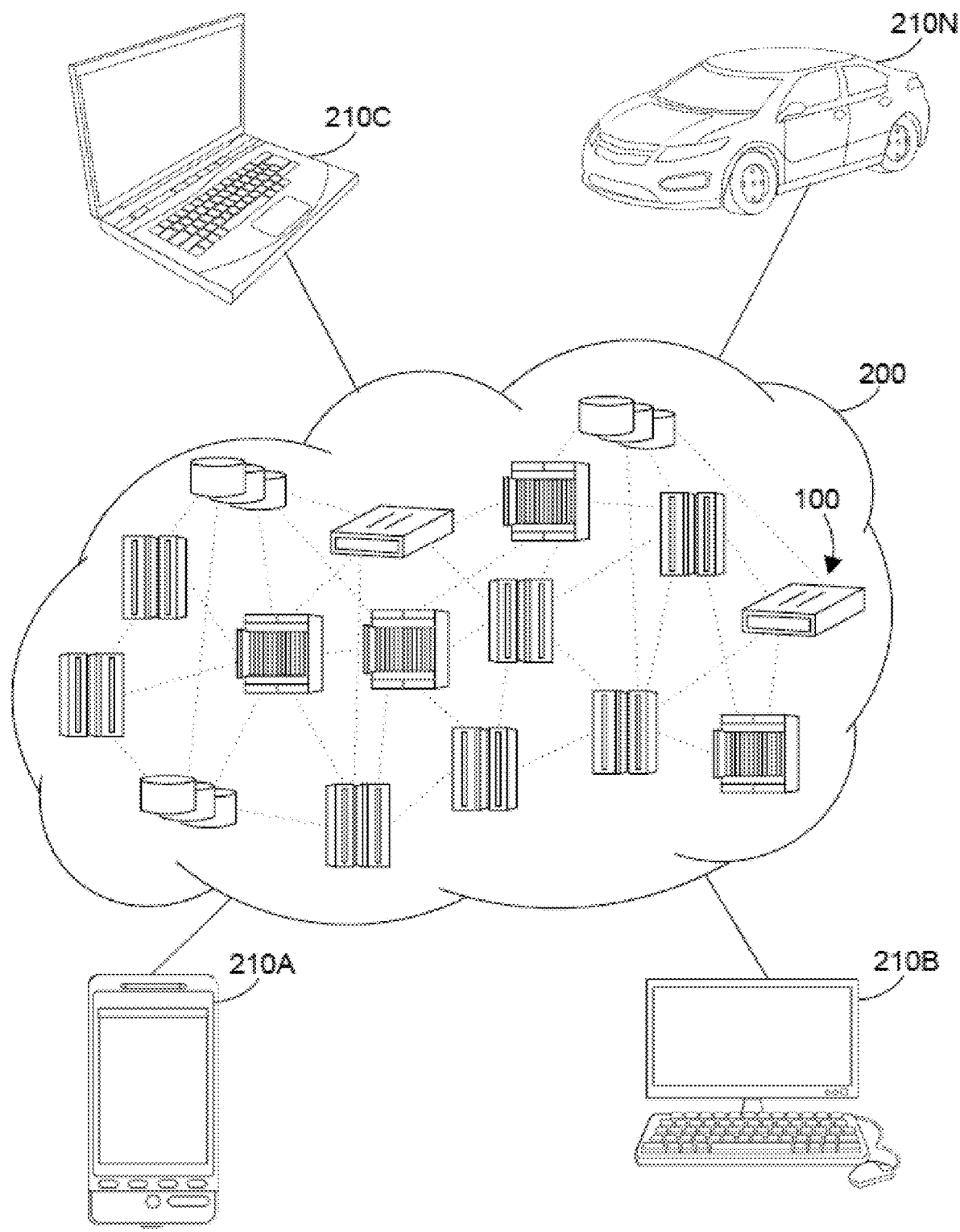
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
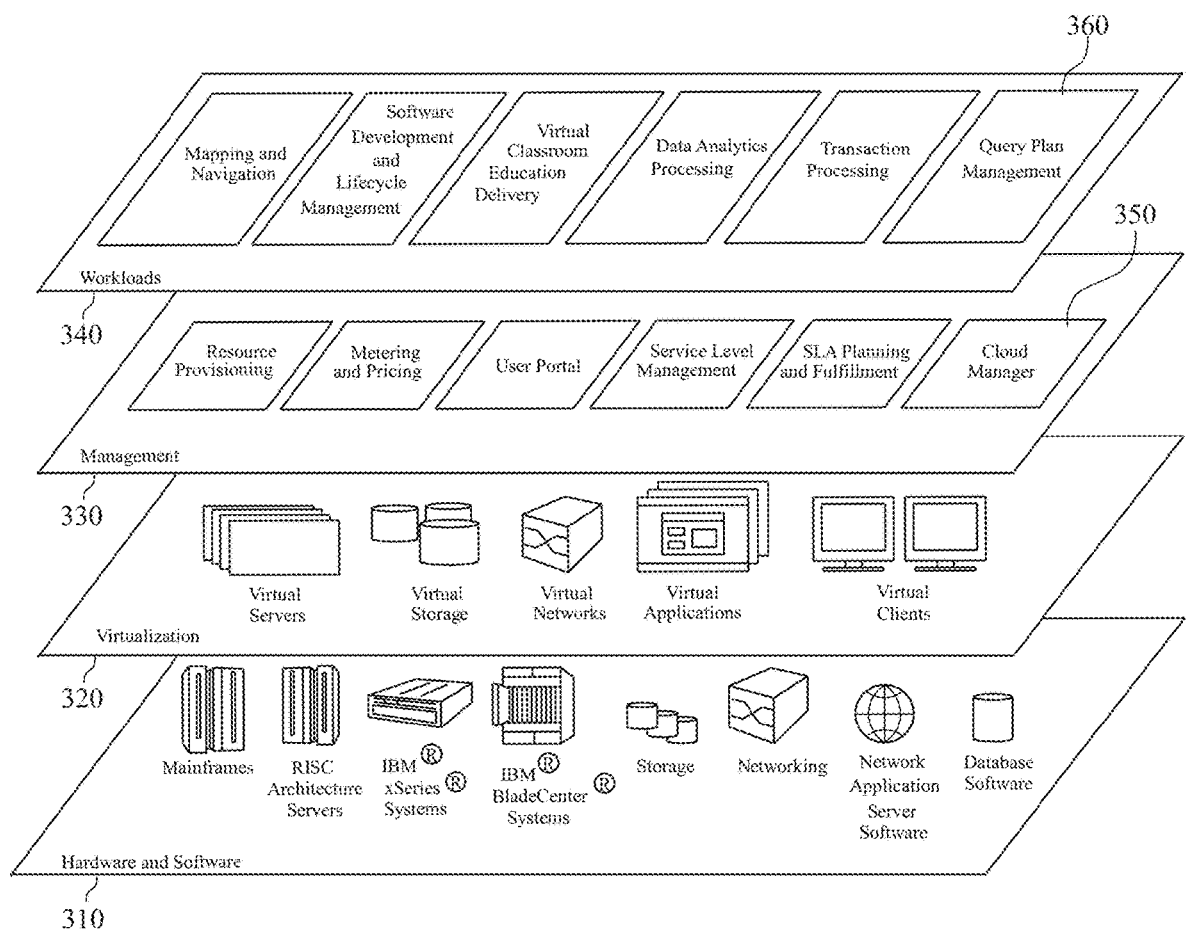
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a query plan manager 360, which may relate to query plan management as discussed in more detail below.

Figure 4:
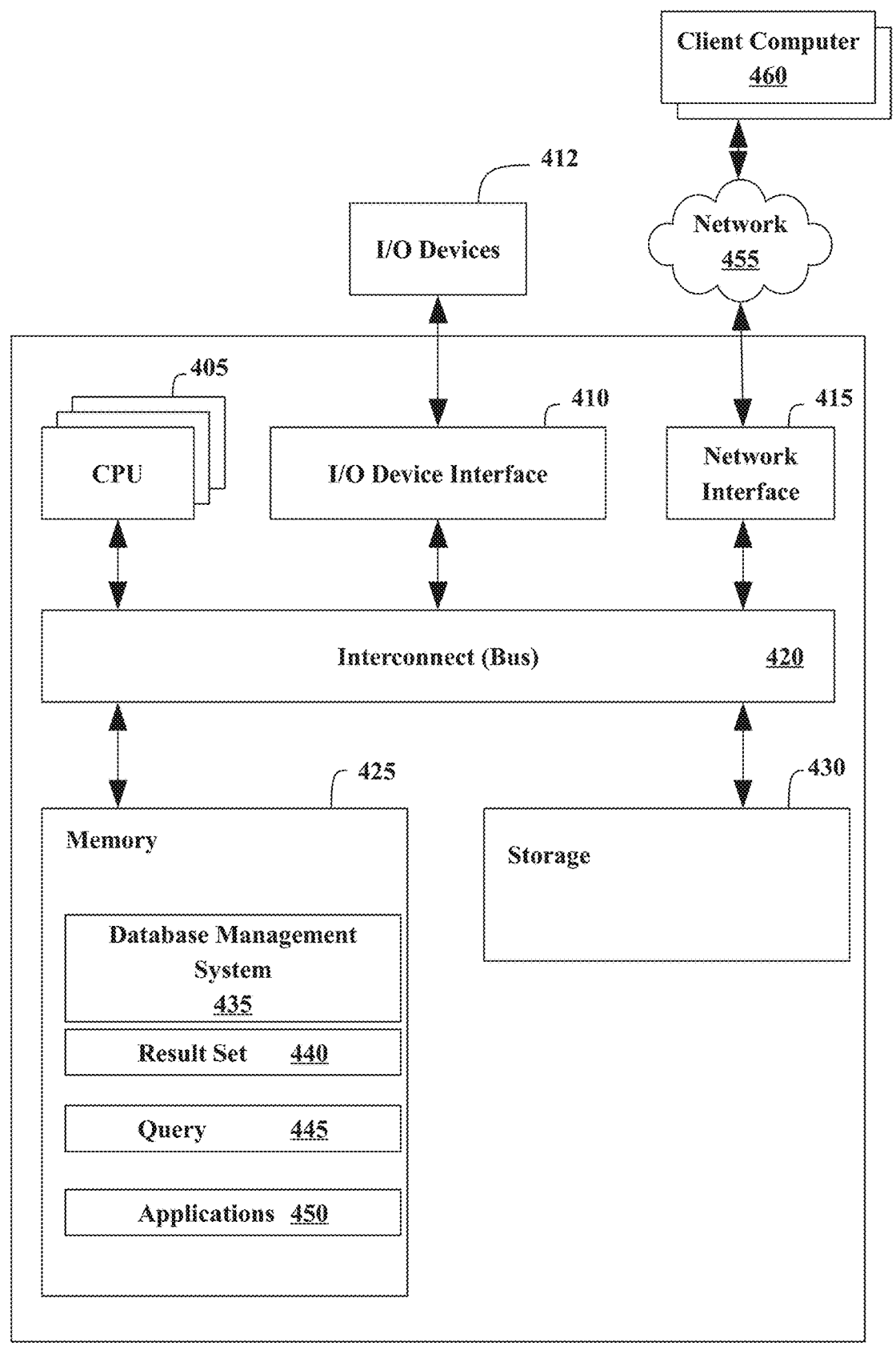
FIG. 4 illustrates an example representation of a computer system connected to a client computer via a network according to embodiments.

FIG. 4 illustrates an example representation of a computer system 400 connected to one or more client computers 460 via a network 455, according to some embodiments. For the purposes of this disclosure, computer system 400 may represent practically any type of computer, computer system, or other programmable electronic device, including but not limited to, a client computer, a server computer, a portable computer, a handheld computer, an embedded controller, etc. In some embodiments, computer system 400 may be implemented using one or more networked computers, e.g., in a cluster or other distributed computing system.

The computer system 400 may include, without limitation, one or more processors (CPUs) 105, a network interface 415, an interconnect 420, a memory 425, and a storage 430. The computer system 400 may also include an I/O device interface 410 used to connect I/O devices 412, e.g., keyboard, display, and mouse devices, to the computer system 400.

Each processor 405 may retrieve and execute programming instructions stored in the memory 425 or storage 430. Similarly, the processor 405 may store and retrieve application data residing in the memory 425. The interconnect 420 may transmit programming instructions and application data between each processor 405, I/O device interface 410, network interface 415, memory 425, and storage 430. The interconnect 420 may be one or more busses. The processor 405 may be a single central processing unit (CPU), multiple CPUs, or a single CPU having multiple processing cores in various embodiments. In one embodiment, a processor 405 may be a digital signal processor (DSP).

The memory 425 may be representative of a random access memory, e.g., Static Random Access Memory (SRAM), Dynamic Random Access Memory (DRAM), read-only memory, or flash memory. The storage 430 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 415 may be configured to transmit data via the communications network 455.

The memory 425 may include a database management system (DBMS) 435, a result set 440, a query 445, and applications 450. Although these elements are illustrated as residing in the memory 425, any of the elements, or combinations thereof, may reside in the storage 430 or partially in the memory 425 and partially in the storage 430. Each of these elements will be described in greater detail in accordance with FIG. 5.

The network 455 may be any suitable network or combination of networks and may support any appropriate protocol suitable for communication of data and/or code to/from the server computer system 400 and the client computer system 460. In some embodiments, the network 455 may support wireless communications. In other embodiments, the network 455 may support hardwired communications. The network 455 may be the Internet and may support Internet Protocol in some embodiments. In other embodiments, the network 455 may be implemented as a local area network (LAN) or a wide area network (WAN). The network 455 may also be implemented as a cellular data network. Although the network 455 is shown as a single network in the figures, one or more networks of the same or different types may be included.

The client computer system 460 may include some or all of the hardware and software elements of the computer system 400 previously described. As shown, there may be one or more client computers 460 connected to the computer system 400 via the network 455. In some embodiments, one or more client computers 460 may send a query 445 by network 455 to computer system 400 and receive a result set 440.

Figure 5:
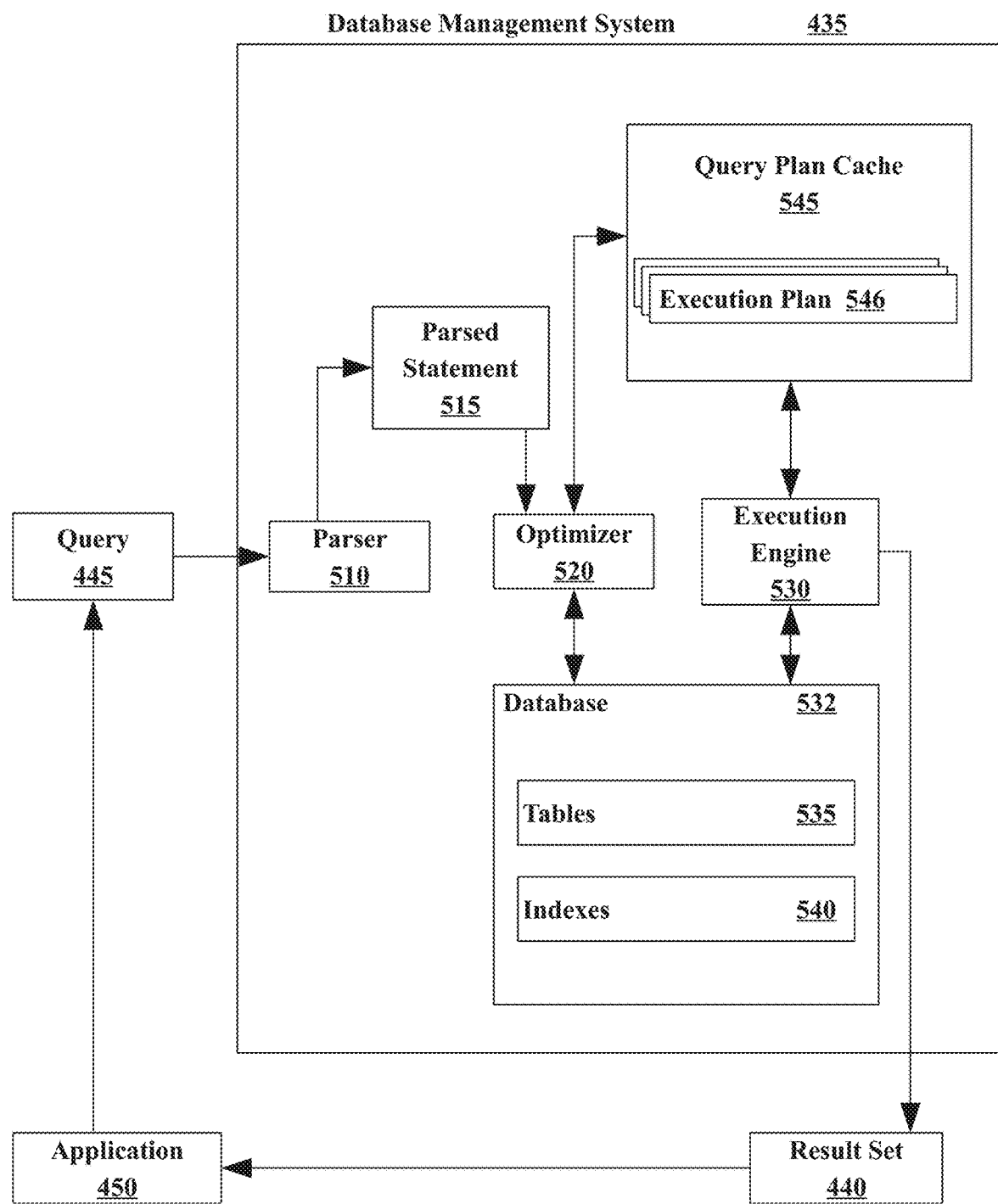
FIG. 5 illustrates an example database management system (DBMS) according to embodiments.

FIG. 5 illustrates an example database management system (DBMS) 435. The DBMS 435 may include a parser 510, an optimizer 520, an execution engine 530, and a database 532. The parser 510 may receive a database query 445 from an application 450. In some embodiments, the database query 445 may be in the form of a Structured Query Language (SQL) statement. The parser 510 may generate a parsed statement 515. The parser 510 may send the parsed statement 515 to an optimizer 520. The optimizer 520 may attempt to optimize the parsed statement. In some embodiments, optimizing may improve the performance of the database query 445 by, for example, reducing the amount of time it takes to provide a user with a response. The optimizer 520 may generate an execution plan 546 (may also be referred to as a query plan or an access plan), which may be maintained in a query plan cache 545, according to some embodiments. The query plan cache 545 may include one or more execution plans 546, including the current execution plan as well as previously used execution plans. Once an execution plan 546 is generated, the execution plan 546 may be sent to the execution engine 530. The execution engine

530 may execute the query 445. Executing the query 445 may include finding and retrieving data in the database tables 535 that satisfies the criteria supplied in the query 445. The execution engine 530 may store the data returned matching the query 445 in a result set 440. The DBMS 435 may return the result set 440 to an application 450, such as the application in which the database query 445 was generated, as a response to the database query 445.

A database 532 may include one or more tables 535 and, in some embodiments, one or more indexes 540. A database table 535 may organize data into rows and columns. Each row of a database table 535 may correspond to an individual entry, a tuple, or a record in the database 532. A column may define what is stored in each entry, tuple, or record. In some embodiments, columns of a table 535 may also be referred to as fields or attributes. Each table 535 within the database 532 may have a unique name. Each column within a table 535 may also have a unique name. A row, tuple, or record, however, within a particular table 535 may not be unique, according to some embodiments. A database 532 may also include one or more indexes 540. An index 540 may be a data structure that may inform the DBMS 435 of the location of a particular record within a table 535 if given a particular indexed column value. In some embodiments, the execution engine 530 may use the one or more indexes 540 to locate data within a table 535. In other embodiments, the execution engine 530 may scan the tables 535 without using an index 540.

As mentioned herein, the optimizer 520 creates the query access plan. The optimizer 520 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 6:
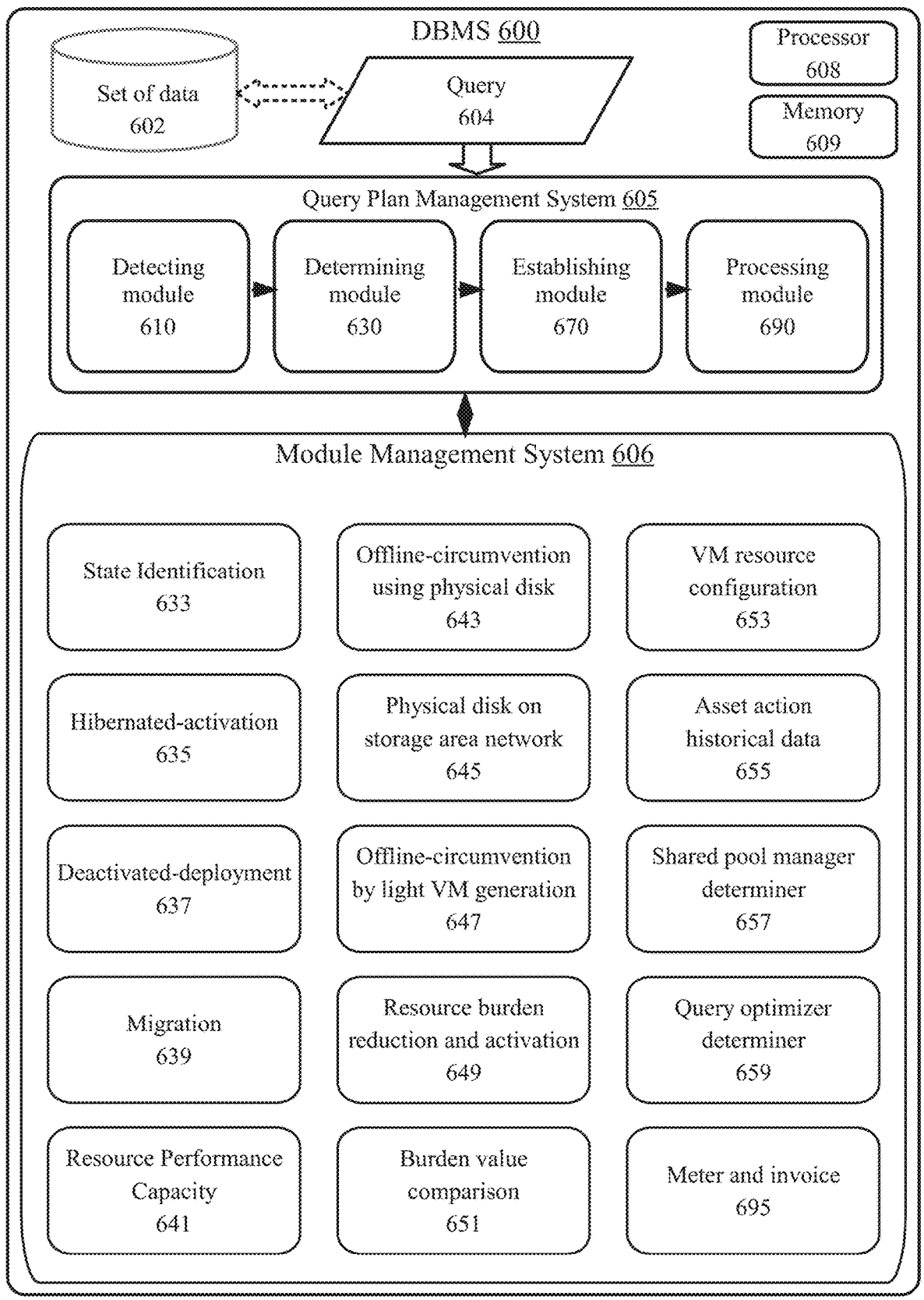
FIG. 6 shows an example system for query plan management according to embodiments.

FIG. 6 shows an example system 600 for query plan management according to embodiments. The example system 600 includes a (computer/hardware) processor 608 and a memory 609. The example system 600 may have a query 604 which relates to a set of data 602 (which may be on a virtual machine of a shared pool of configurable computing resources). The example system 600 can include a query plan management system 605. The query plan management system 605 may include a detecting module 610, a determining module 630, an establishing module 670, and a processing module 690. In embodiments, other aspects may be included such as a module management system 606 which can have a set of modules.

The detecting module 610 may detect the query 604 which relates to the set of data 602 located on the shared pool of configurable computing resources (e.g., the virtual machine which has the set of data 602). Detecting can include receiving, sensing, or discovering. Detection may occur by a query optimizer or a shared pool manager. For example, if a query optimizer is running a specific query, the query optimizer may discover (e.g., via a reference or pointer) that a particular table/index is on a specific virtual machine which is hibernated or deactivated. The specific virtual machine, which can be used to provide a computing capability, may be included in a cloud environment. As such, the particular table/index can be located on the cloud environment.

The determining module 630 may determine, with respect to the virtual machine, a set of burden values of performing a set of asset actions (e.g., a set of operations on the virtual machine). Performing the set of asset actions can include initiating, launching, executing, running, or carrying-out one or more asset actions. The set of asset actions can include a capture operation (e.g., capture an operational state of an asset such as on, off, active, inactive, reading, writing, or execute a process on the asset such as read, analyze, write), a deploy operation (e.g., creating a virtual machine and initiating deployment of the virtual machine), a migration operation (e.g., a reorganization of components, a particular component may be copied from a first location to a second location for storage/processing on a different virtual/physical machine and the particular component can be removed/deleted from the first location), a resize operation (e.g., change a capacity of a virtual machine such as from 64 gigabytes to 32 gigabytes), a recovery operation (e.g., generating a backup version of a particular component on a same machine or a different machine), a hibernate operation (e.g., to save resources, to stage removal of the virtual machine), or a shut-down operation (e.g., to remove/delete the virtual machine). The set of burden values (e.g., numerical amounts, scores, tiers, levels) may indicate a burden, price, or cost (e.g., expected, predicted, estimated, historical) of asset action performance. Determining the set of burden values can include ascertaining, resolving, formulating, computing, or calculating the set of burden values (e.g., based on predictions or historical information for an asset action with respect to the virtual machine related to computing capabilities/resources).

The establishing module 670 may establish, based on the set of burden values, a query plan to access the set of data. Establishing can include creating, generating, structuring, constructing, forming, ascertaining, identifying, resolving, compiling, or computing. To illustrate, because structured query language (SQL) is declarative, there can typically be multiple different ways to execute a given query (e.g., query plans) and each of those ways yields a different performance (e.g., while arriving at the same results). A query plan can include an ordered sequence of steps used to access or modify information in SQL based data systems. A typical query optimizer considers candidate query plans for a given query and determines which of those query plans will be efficient (e.g., lesser amount of latency). Accordingly, the set of burden values may be evaluated/compared among each other and, for example, a less costly query plan may be established/selected.

The processing module 690 may process, using at least one asset action of the set of asset actions, the query plan. The query plan is processed/executed/run using an asset action (e.g., an operation established/selected as part of the query plan based on the set of burden values). For example, the virtual machine may be awakened, migrated, or deployed (at a cost) and the query run. The query plan may be processed for storage (e.g., in a data store) or presentation (e.g., via a display). In embodiments, processing the query plan includes providing a valid results-set. Providing the valid results-set can include using the query plan to route the valid results-set to an originator of the query, process an output with respect to the valid results-set, return the valid results-set to storage, or display at least a portion of a valid results-set (e.g., to a user).

In embodiments, a state identification module 633 identifies a current state of the virtual machine (e.g., an error event is indicated for running the query) or a target state of the virtual machine (e.g., to run the query). State identification may occur by a query optimizer. For example, the current/target state(s) can include online, offline, hibernating, idle, active, inactive, starting-up, shutting-down, and the like. A shared pool manager may have a controller which adjusts between states or tracks state data (e.g., historical states, current state, predicted states, temporal periods for each state, resource usage). In certain embodiments, state identification can include sending a request to the shared pool manager or the virtual machine. In various embodiments, state identification can include retrieving state data from the shared pool manager or the virtual machine. Queries may only be able to run in a subset of possible states. As such, if the current state indicates the query cannot be effectively/efficiently run (e.g., error event is indicated) then the virtual machine may be adjusted to a target state in which the query can be run (e.g., the error event is not anticipated). Other possibilities are contemplated, including those described herein.

In embodiments, a hibernation-activation module 635 detects that the virtual machine indicates a hibernated state, and the set of asset actions includes activation of the virtual machine. The hibernation-activation module 635 may receive a packet (e.g., which may be wrapped by the shared pool manager for security purposes, which can be sent from the query optimizer), unwrap the packet as appropriate, and decipher that the virtual machine is currently in a hibernation mode. An activation asset action may be chosen to activate the virtual machine so as to facilitate processing using the virtual machine. The hibernation-activation module 635 can initiate activation using a messaging request to the shared pool manager. In response, the shared pool manager may stimulate the virtual machine. In certain embodiments, the hibernation-activation module 635 may directly stimulate the virtual machine (e.g., and the shared pool manager may detect activation or be notified). The communication described herewith may apply elsewhere as described herein (e.g., packet transmissions may be similar with respect to other modules).

In embodiments, a deactivated-deployment module 637 detects that the virtual machine indicates a deactivated state, and the set of asset actions includes deployment of the virtual machine. The deactivated-deployment module 637 can ping the virtual machine and receive a response (or lack thereof within a threshold temporal period) to ascertain the virtual machine is in a deactivated state (e.g., shut-down, turned-off, lacking power). A deployment asset action may be chosen to deploy the virtual machine so as to facilitate processing using the virtual machine. The deactivated-deployment module 637 may initiate deployment as described in other modules herein (e.g., directly with the virtual machine, via the shared pool manager). In various embodiments, modules such as the deactivated-deployment module 637 may compute/calculate burdens/costs for the asset action.

In embodiments, a migration module 639 detects that the virtual machine runs on a first physical compute node of the shared pool of configurable computing resources, and the set of asset actions includes migration of the virtual machine to a second physical compute node of the shared pool of configurable computing resources. For example, the second physical compute node may provide performance or efficiency benefits relative to the first physical compute node and the burdens/costs of migration. The migration module 639 can initiate the migration between the first and second physical compute nodes using the shared pool manager, the query optimizer, or directly with the first and second physical compute nodes. The shared pool manager may record the migration in a data store and perform its tracking mechanisms. Effects on the overall shared pool of configurable computing resources may be accounted for by the shared pool manager (e.g., load balancing in response to the migration). Processing may be initiated on the second physical compute node once the virtual machine has been instantiated (e.g., before full completion of migration-related operations such as recording meta-data related to the migration by the shared pool manager).

In certain embodiments, a resource performance capacity module 641 indicates that a second resource performance capacity of the second physical compute node exceeds a first resource performance capacity of the first physical compute node. Resource performance capacities may relate to processing factors, memory factors, bandwidth factors, input-output factors, etc. Such factors can have available capacities, in-use capacities, total capacities, etc. For example, the second physical compute node may have more available memory (to process the query) than the first physical compute node. As such, migration using the migration module 639 may be initiated. The resource performance capacity module 641 may measure resource performance capacities directly or may use data collected by the shared pool manager which the module requests, receives, or retrieves.

In embodiments, an offline-circumvention using physical disk module 643 detects that the virtual machine indicates an offline state, and the set of asset actions includes circumvention of the virtual machine using an associated physical disk to access the set of data. For example, if the virtual machine is sensed to be offline, a burden/cost may be computed/calculated to circumvent the virtual machine by accessing/attaching to the virtual machine's disk and configuration directly (e.g., using location and format information) in order to copy a set of tables/indexes (e.g., and then run the query locally). In certain embodiments, a physical disk on storage area network module 645 indicates that the associated physical disk is located on a storage area network (SAN). Accordingly, the offline-circumvention using physical disk module 643 may connect with the SAN via the physical disk on storage area network module 645 to retrieve data such as the set of tables/indexes without changing the (offline) state of the virtual machine. Other variations are contemplated which may use various techniques described herein.

In embodiments, an offline-circumvention by light VM generation module 647 detects that the virtual machine indicates an offline state, and the set of asset actions includes circumvention of the virtual machine by generating a light virtual machine to access the set of data. For example, a light virtual machine may be instantiated which can attach to the appropriate disk and allow the query to be run. The light virtual machine may have limited enablement of functionality such as being without function other than allowing, permitting, denying, authenticating, or otherwise gate-keeping access to data such as the set of tables/indexes. The light virtual machine may be saved into a template so that it can be redeployed as appropriate when offline data such as the set of tables/indexes are requested to be accessed.

In embodiments, a resource burden reduction and activation module 649 activates the virtual machine (as an asset action) in response to reducing a resource burden of a separate virtual machine. As such, aspects may include load-balancing benefits. For example, if the shared pool of configurable computing resources lacks a sufficient resource capability to run the query (e.g., the appropriate virtual machine capacity), a first virtual machine may be shutdown/hibernated and a second virtual machine (e.g., having the appropriate virtual machine capacity) may be activated in order to facilitate the running of the query. As such, the query can be run at least in part based on the second virtual machine being activated. In response to running the query, the second virtual machine can be shutdown/hibernated and the first virtual machine reactivated to return the overall shared pool of configurable computing resources to a similar/same state as before. Other examples may include varying resource usages of one or more virtual machines to provide for at least one virtual machine to carry-out performance of processing the query.

In various embodiments, a burden value comparison module 651 compares a first burden value to perform a first asset action with a second burden value to perform the second asset action. For example, the query optimizer may compare a first cost to awaken the virtual machine and have the virtual machine run a query with respect to a second cost of running a query external to the virtual machine by attaching to the sleeping virtual machine's file system. The comparison may account for burden values which are within a threshold by choosing the asset action which will cause a lesser amount of deterioration on the physical components. Outside of the threshold, the comparison may choose the less costliest asset action. In embodiments, a group of candidate asset actions may be evaluated and randomly selected when the burden values of the candidate asset actions are within a threshold. Accordingly, data may be subsequently collected to ascertain actual performance of the asset actions instead of mere theoretical projections. The actual performance data may be used to weight selections based on the comparison in the future.

In certain embodiments, a VM resource configuration module 653 bases the set of burden values on a resource configuration of the virtual machine. For example, the set of burden values may be based on a model of the virtual machine activity such as virtual machine size and speed of hardware. In certain embodiments, an asset action historical data module 655 bases the set of burden values on a set of historical data for performing the set of asset actions. For example, previous similar operations may be recorded including performance-related metrics for the operations. Various other techniques are contemplated with respect to aspects the set of burden values are based on (e.g., combinations/permutations of multiple asset actions to run one query).

In various embodiments, a shared pool manager determiner module 657 determines the set of burden values (e.g., time estimates) using a shared pool manager. Accordingly, the shared pool manager may be physically separate from a query optimizer. The query optimizer may receive the set of burden values subsequent to the determination. In various embodiments, a query optimizer determiner module 659 determines the set of burden values using the query optimizer. As such, the shared pool manager may or may not be notified of the set of burden values. The shared pool manager may be requested to perform an asset action (e.g., command, operation) without explicit collection of the set of burden values.

In certain embodiments, a meter and invoice module 695 meters use of the query plan management and generates an invoice based on the metered use. A usage assessment may be generated with respect to the query plan management. Use of the query plan management may be metered by the meter and invoice module 695. For example, query plans may be measured based on factors such as network utilization saved, virtual machine productivity time-lines achieved, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use by the meter and invoice module 695. The generated invoice may be provided (e.g., displayed in a dialog box, sent or transferred by e-mail, text message, traditional mail) to a user for notification, acknowledgment, or payment.

Figure 7:
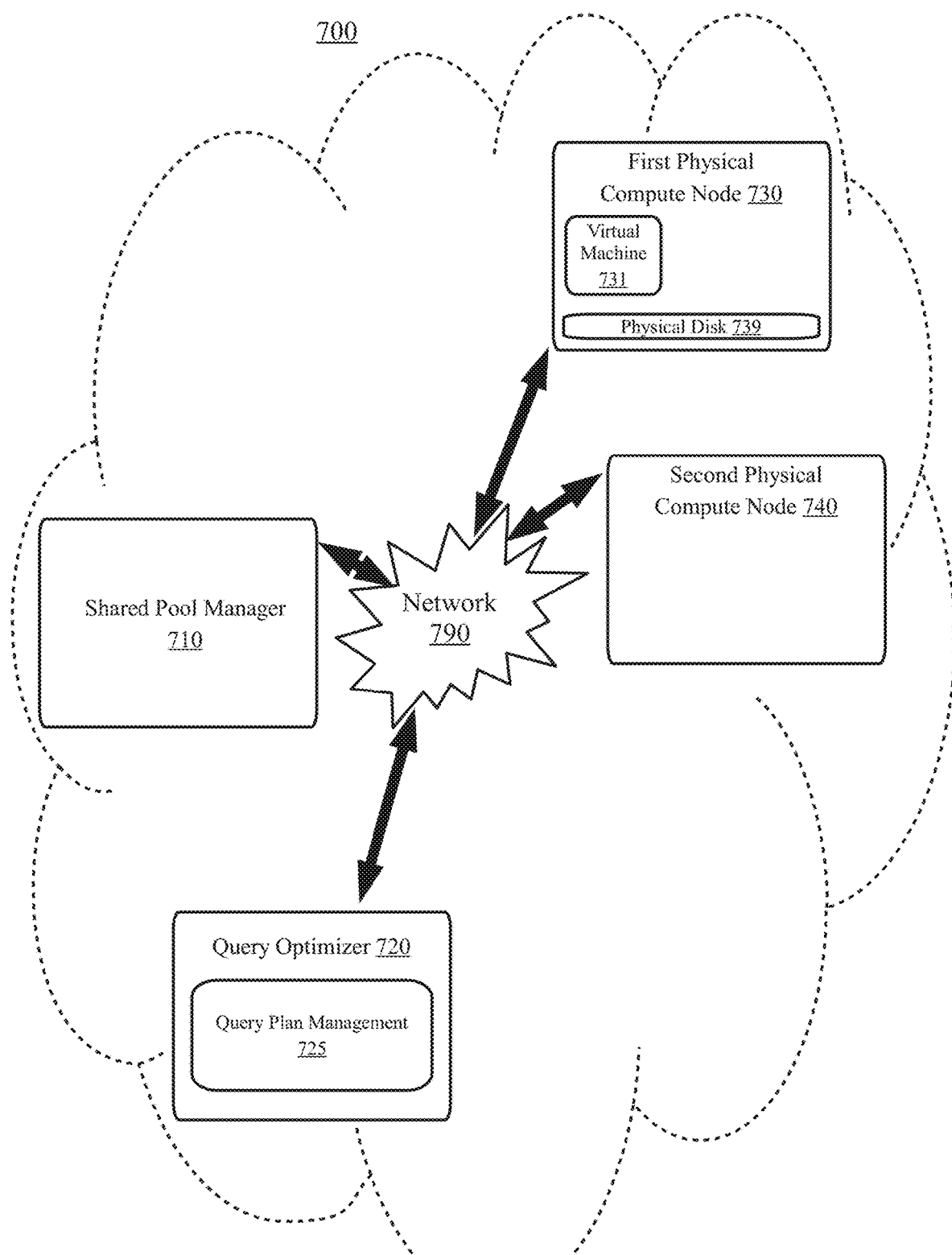
FIG. 7 depicts a shared pool of configurable computing resources according to embodiments.

FIG. 7 depicts a shared pool of configurable computing resources 700 according to embodiments. Aspects illustrated in FIG. 7 may be similar or the same as corresponding aspects described herein (e.g., related to FIG. 6). A network 790 may interface and connect with a shared pool manager 710, a query optimizer 720 which includes a query plan management system/module 725, a first physical compute node 730 which has a virtual machine 731 and a physical disk 739, and a second physical compute node 740. Aspects described with respect to FIG. 6 may be applied as illustrated in FIG. 7. For instance, if the virtual machine 731 is offline or hibernating, the query optimizer 720 may directly attach to the physical disk 739. As another example, a burden value may be determined for migrating the virtual machine 731 from the first physical compute node 730 to the second physical compute node 740. As an additional example, if the virtual machine 731 is sleeping, the virtual machine 731 may be awoken by the query optimizer 720 or the shared pool manager 710. Various possibilities consistent with aspects described herein are contemplated.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for query plan management associated with a shared pool of configurable computing resources, the method comprising:

detecting a query that instructs a virtual machine to access a set of data;

determining, with respect to the virtual machine, a set of burden values of performing a set of asset actions, each asset action including one or more operations to enable retrieval of the set of data and execution of the query, each burden value indicating a cost of performing an associated asset action;

establishing, based on the set of burden values, a query plan to access the set of data; and processing, using at least one asset action of the set of asset actions, the query plan.

2. The method of claim 1, wherein:
the virtual machine indicates a hibernated state, and
the set of asset actions includes activation of the virtual machine.

3. The method of claim 1, wherein:
the virtual machine indicates a deactivated state, and
the set of asset actions includes deployment of the virtual machine.

4. The method of claim 1, further comprising:
identifying, by a query optimizer, a current state of the virtual machine; and
determining the virtual machine is unable to execute the query based on the current state,
wherein the determining the set of burden values is performed in response to determining that the virtual machine is unable to execute the query.

5. The method of claim 4, wherein:
the virtual machine runs on a first physical compute node of the shared pool of configurable computing resources, and
the set of asset actions includes migration of the virtual machine to a second physical compute node of the shared pool of configurable computing resources,
wherein a second resource performance capacity of the second physical compute node exceeds a first resource performance capacity of the first physical compute node.

6. The method of claim 4, wherein:
the virtual machine indicates an offline state, and
the set of asset actions includes circumvention of the virtual machine using an associated physical disk to access the set of data without instantiating any virtual machines.

7. The method of claim 1, wherein:
the set of asset actions includes circumvention of the virtual machine using an associated physical disk to access the set of data and execute the query.

8. The method of claim 7, wherein the circumvention of the virtual machine is performed without instantiating any virtual machines.

9. The method of claim 1, wherein:
the virtual machine indicates an offline state, and
the set of asset actions includes circumvention of the virtual machine by generating a light virtual machine to access the set of data.

10. The method of claim 1, wherein the set of asset actions includes activating the virtual machine in response to reducing a resource burden of a separate virtual machine.

11. The method of claim 1, wherein the set of burden values is based on a resource configuration of the virtual machine.

12. The method of claim 1, wherein the set of burden values is based on a set of historical data for performing the set of asset actions.

13. The method of claim 1, wherein a shared pool manager determines the set of burden values, further comprising:
receiving, by a query optimizer, the set of burden values.

14. The method of claim 1, wherein:
the set of asset actions includes circumvention of the virtual machine by using a light virtual machine to access the set of data, and the light virtual machine includes a smaller set of functionality compared to the virtual machine.

15. The method of claim 14, wherein the light virtual machine is saved into a template such that it can be redeployed to retrieve the set of data when the virtual machine is unable to access the set of data.

16. The method of claim 1, wherein the at least one asset action includes circumventing the virtual machine to access the data, and wherein processing the query plan comprises:
 determining location and format information for a physical disk associated with the virtual machine;
 directly attaching to the physical disk without changing a state of the virtual machine and without communicating with the virtual machine;
 copying a set of tables associated with the set of data; and
 executing the query on the copied set of tables.

17. A system for query plan management, the system comprising:
 a memory, and
 a processor communicatively coupled to the memory, wherein the processor is configured to perform a method comprising:
 detecting a query requesting a set of data accessible by a virtual machine;
 determining that the virtual machine is unable to execute the query;
 determining, in response to determining that the virtual machine is unable to execute the query, a set of burden values of performing a set of asset actions, each asset action including one or more operations to enable retrieval of the set of data and execution of the query, each burden value indicating a cost of performing an associated asset action;
 establishing, based on the set of burden values, a query plan to access the set of data, the query plan including at least one asset action of the set of asset actions; and
 processing the query plan.

18. A computer program product for query plan management, the computer program product comprising one or more computer readable storage media having program instructions embodied therewith, the program instructions executable by a processor to cause the processor to perform a method comprising:
 detecting a query which relates to a set of data accessible by a virtual machine that includes the set of data;
 determining, with respect to the virtual machine, a set of burden values of performing a set of asset actions, each asset action of the set of asset actions being one or more operations performed to modify the virtual machine to enable the virtual machine to execute the query, each burden value indicating a cost of performing an associated asset action;
 determining, based on the set of burden values, a particular asset action to perform;
 generating a query plan to access the set of data, the query plan including the particular asset action; and
 executing, using the particular asset action, the query plan.

19. The computer program product of claim 18, wherein the determining the particular asset action to perform includes:
 determining that two or more burden values associated with two or more asset actions are within a threshold value of each other; and
 responsive to determining that the two or more burden values are within the threshold value of each other, randomly selecting at least one of the two or more asset actions.

20. The computer program product of claim 18, wherein the determining the particular asset action to perform includes determining that the particular asset action has a lowest burden value of the set of asset actions.

\* \* \* \* \*